United States Patent
Coll et al.

(10) Patent No.: US 7,501,750 B2
(45) Date of Patent: Mar. 10, 2009

(54) EMITTING DEVICE HAVING ELECTRON EMITTING NANOSTRUCTURES AND METHOD OF OPERATION

(75) Inventors: Bernard F. Coll, Fountain Hills, AZ (US); Kenneth A. Dean, Phoenix, AZ (US); Yi Wei, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 606 days.

(21) Appl. No.: 11/142,053

(22) Filed: May 31, 2005

(65) Prior Publication Data

US 2009/0021136 A1  Jan. 22, 2009

(51) Int. Cl.
*H01J 63/04* (2006.01)
*H01J 19/06* (2006.01)

(52) U.S. Cl. .................. 313/495; 313/311; 313/346 R; 313/336; 977/742

(58) Field of Classification Search .............. 313/495, 313/311, 346 R, 336
See application file for complete search history.

(56) References Cited

U.S. PATENT DOCUMENTS

| | | | |
|---|---|---|---|
| 5,023,110 A | | 6/1991 | Nomura et al. |
| 5,759,080 A | * | 6/1998 | Yoshioka et al. ............... 445/51 |
| 5,763,997 A | * | 6/1998 | Kumar ........................ 313/495 |
| 6,100,628 A | * | 8/2000 | Coll et al. .................... 313/310 |
| 6,596,187 B2 | | 7/2003 | Coll et al. |
| 6,628,053 B1 | | 9/2003 | Den et al. |
| 6,720,728 B2 | | 4/2004 | Den et al. |
| 6,891,319 B2 | * | 5/2005 | Dean et al. ................... 313/309 |
| 7,070,472 B2 | * | 7/2006 | Dean et al. ..................... 445/24 |
| 2003/0042834 A1 | * | 3/2003 | Dean et al. ................... 313/309 |
| 2004/0051443 A1 | * | 3/2004 | Ueda et al. ................... 313/495 |

OTHER PUBLICATIONS

M.I. Elinson, The Emission of Hot Electrons and the Field Emission of Electrons from Tin Oxide, May 13, 1964, p. 1290-1298.

* cited by examiner

*Primary Examiner*—Peter Macchiarolo

(57) ABSTRACT

An emission device is provided for extracting electrons onto an anode of a visual display. The emission device (10) includes a conductivity limited material (18) positioned between first and second electrodes (14, 16) and having a surface (26). A plurality of catalytic nanoparticles (22) are distributed throughout the conductivity limited material (18), wherein some of the catalytic particles (22) are contiguous to the surface (26). A plurality of nanostructures (24), such as carbon nanotubes, are grown from the catalytic nanoparticles (22) contiguous to the surface (26). A voltage is applied across the conductivity limited material (18) having a plurality of catalytic particles (22) embedded therein, thereby causing the electrons to tunnel between the catalytic particles (22). An anode (28) is spaced apart from the nanostructures (24) for extracting and receiving electrons emitted from the nanostructures (24) when a first potential is applied across the first and second electrodes (14, 16) and a second potential is applied to the anode (28).

20 Claims, 2 Drawing Sheets

EMITTING DEVICE HAVING ELECTRON EMITTING NANOSTRUCTURES AND METHOD OF OPERATION

FIELD OF THE INVENTION

The present invention generally relates to carbon nanotube visual displays, and more particularly to electron source structures involving the combined mechanism of electron conduction and electron extraction.

BACKGROUND OF THE INVENTION

A nanotube, and more specifically a carbon nanotube, is known to be useful for providing electron emission in a vacuum device, such as a field emission display. The use of a carbon nanotube as an electron emitter has reduced the cost of vacuum devices, including the cost of a field emission display. The reduction in cost of the field emission display has been obtained by replacing other electron emitters (e.g., a Spindt tip), that generally have higher fabrication costs with a carbon nanotube based electron emitter.

One approach for fabricating nanotubes includes depositing metal films using ion beam sputtering to form catalytic nanoparticles. In an article by L. Delzeit, B. Chen, A. Cassell, R. Stevens, C. Nguyen and M. Meyyappan in Chem. Phys. Lett. 348, 368 (2002), CVD growth of single walled nanotubes at temperatures of 900° C. and above was described using Fe or an Fe/Mo bi-layer thin film supported with a thin aluminum under layer. However, the required high growth temperature prevents integration of carbon nanotubes growth with other device fabrication processes.

Ni has been used as one of the catalytic materials for the formation of single walled nanotubes during a laser ablation and arc discharge process as described by A. Thess, R. Lee, P. Nikolaev, H. Dai, P. Petit, J. Robert, C. Xu, Y. H. Lee, S. G. Kim, A. G. Rinzler, D. T. Colbert, G. E. Scuseria, D. Tomanet, J. E. Fischer, and R. E. Smalley in Science, 273, 483 (1996) and by D. S. Bethune, C. H. Kiang, M. S. de Vries, G. Gorman, R. Savory, J. Vazquez, and R. Beyers in Nature, 363, 605 (1993).

Field effect devices typically comprise a metal cathode on a substrate, with carbon nanotubes grown on the cathode. A metal catalyst may be positioned between the cathode and the carbon nanotubes for facilitating carbon nanotube growth. A gate electrode is positioned between an anode and the tops of the carbon nanotubes for controlling electron emission from the carbon nanotubes. Electrons flow from the metal cathode through the metal catalyst if present, and out the carbon nanotubes to the anode spaced therefrom.

A different approach comprises an electron emitting structure including a thin film containing fine particles between opposing electrodes. Voltage is applied across the thin film to impart a surface conduction current. Islands of the spatially discontinuous film serve as electron emitting regions. A microcrack is formed in the film for effectively emitting electrons.

However, the microcrack process requires multiple process steps that are costly and difficult to control. Furthermore, the conversion of the conduction current to emission current efficiency is low.

BRIEF SUMMARY OF THE INVENTION

An emission device is provided for extracting electrons onto an anode of a visual display. The emission device includes a conductivity limited material positioned between first and second electrodes and having a surface. A plurality of catalytic nanoparticles are distributed throughout the conductivity limited material, wherein some of the catalytic particles are contiguous to the surface. A plurality of nanostructures, such as carbon nanotubes, are grown from the catalytic nanoparticles contiguous to the surface. A voltage is applied across the conductivity limited material having a plurality of catalytic particles embedded therein, thereby causing the electrons to tunnel between the catalytic particles. An anode is spaced apart from the nanostructures for extracting and receiving electrons emitted from the nanostructures when a first potential is applied across the first and second electrodes and a second potential is applied to the anode.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
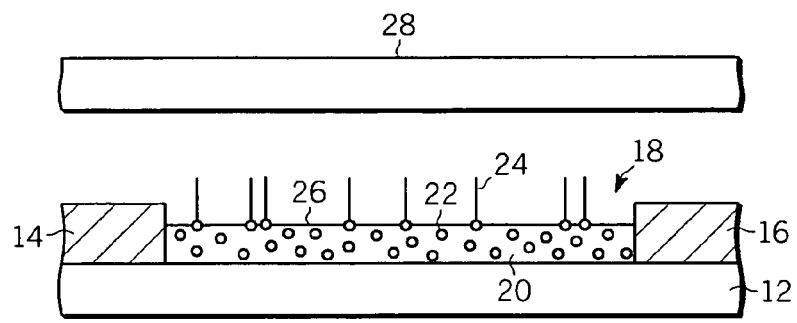
FIG. 1 is a cross section of a first embodiment of the present invention.

Referring to FIG. 1, an emission device 10 is illustrated for forming a catalyst 18 on a substrate 12 that can be used to grow nanostructures 24, and more preferably carbon nanotubes according to a preferred exemplary embodiment of the present invention. The device 10 may, for example, be a display, and the nanostructures 24 may be any type of structure capable of conducting electrons, for example, carbon nanotubes or carbon fibers. Using masking techniques well known in the industry, metal electrodes 14 and 16 are deposited on the substrate 12. The substrate 12 comprises silicon; however, alternate materials, for example, glass, ceramic, metal, a semiconductor material, or a flexible material, are anticipated by this disclosure. Substrate 12 can include control electronics or other circuitry, which are not shown in this embodiment for simplicity. Also, substrate 12 may include an insulating layer, such as silicon dioxide, silicon nitride, or the like between the substrate 12 and the electrodes 14, 16. The metal electrodes 14, 16 comprise molybdenum, but may comprise any metal with a high melting temperature, for example, Nobium, Hafnium, tungsten or iridium, and are deposited at room temperature up to 500° C. The electrodes 14, 16 are spaced between 20 and 100 micrometers apart, and more preferably 50 micrometers apart. The thickness of the electrodes 14, 16 is between 0.01 and 100 micrometers, and would preferably be 1.0 micrometers.

A material 18 is deposited between the electrodes 14 and 16 and on the substrate 12. The material 18, for example, comprises a conductivity limited material 20 of, for example, oxides of silicon, aluminum, or zirconium, and would preferably be approximately 1 micron thick. The material 18 also is immiscible with catalytic particles 22 of metal. Examples of suitable catalytic particles 22 include titanium, vanadium, chromium, manganese, copper, zirconium, niobium, molybdenum, silver, hafnium, tantalum, tungsten, rhenium, gold; and preferably ruthenium, rhodium, palladium, osmium, iridium, platinum; and more preferably nickel, iron, cobalt, or a combination thereof. The catalytic particles 22 may have a radius in the range of 0.5 to 100 nanometers, and preferably 2.5 nanometers. The catalytic particles 22 may be spaced apart in the range of 1 to 100 nanometers, and preferably 5.0 nanometers.

The process used to place the material 18 on the substrate may comprise any of several known processes. For example, the dielectric material 20 and the metal for forming the catalytic particles 22 may be co-evaporated onto the substrate 12. As the material 18 forms, the metal coalesces into the catalytic particles 22. Alternatively, the material 18 may be formed by combining two salts of a dielectric and a metal and applying to the substrate. Yet another alternative would be to ink jet print the material 18 onto the substrate using methods known to those in the industry.

Nanostructures 24 are then grown from the catalytic particles that have formed in the dielectric material 20 at its surface 26 by exposing the device 10 to a carbon containing gas at less than 550° C. for a few minutes, for example. It should be understood that the nanostructures 24 may be grown by any method known in the industry. The nano-composite material 18 allows for both the direct and selective growth of nanostructures 24 by CVD techniques, e.g., thermal CVD, HF-CVD, and PE-CVD, at low temperature and a controlled electron transport and injection in the nanostructures 24 modulated by the voltage applied between the two electrodes 14, 16. The nanostructures 24 will emit electrons toward the anode 28 for illuminating phosphors (not shown) positioned on the anode 28 as is well known in the industry.

The material 18 (nano-composite thin film) displays unique electron transport properties. The characteristic of the conduction current depends on both the concentration and the dimension of the catalyst particles 22 embedded in the dielectric material 20. The nano-structure of the material 18 depends on the metal catalyst concentration (particle dimension and distribution) in the material 18 (dielectric matrix), a critical concentration usually called "percolation threshold" (PT). This nano-structure may vary from metal nano-particles in the dielectric material 20, to a filamentary metal network structure containing insulator nano-cluster. A metal catalyst content higher than the percolation threshold leads to an electrical conduction in the material 18, which is typical of metals, and for the growth of large carbon nanotubes 24 densely packed. For a metal catalyst content lower than the percolation threshold, the electron conduction occurs by activated mechanisms such as electron tunneling and/or electron hopping and the dependence of the catalyst electrical conductivity on temperature becomes non linear.

When a potential is applied across the electrodes 14 and 16 in the range of 5 to 20 volts, and more preferably of 10 volts, electrons will percolate through the material 18, generally from one electrode to the other. The percolation of electrons may be thought of as "hopping", or tunneling through the dielectric material 20, from one catalytic particle 22 to another, following the path of lowest activation energy, or least resistance. Some of the electrons will be "hopping" to the catalytic particles 22 that are positioned on or at the surface 26. Current transport across the electrode 14 and 16 within the material 18 may be explained by substrate assisted tunneling. The electrons transfer between metal catalyst particles 22 under an activated mechanism. Because the electron tunneling occurs over the whole surface 26 of the material 18, the current is conductivity-limited. This conduction-limited current involves an energy activation process which is associated with the dimension of catalytic particles 22. The activation energy of the conductivity-limited material 18 (nano-composite thin film) depends on the electrostatic energy of the conductive catalyst particles 22 of a radius with respect to distance to a neighbor catalytic particle 22. When a voltage is applied between electrodes 14 and 16, the activation energy becomes field dependent. The bias voltage would preferable be 5 volts, but may be in the range of 3 to 10 volts. Once the electrons reach the catalytic particle 22 from which a nanostructure 24 has been grown, and due to the positive bias on the anode 28, the electrons will continue along the nanostructure 24 and exit towards the anode 28.

In summary, the material 18 (nano-structured catalyst thin film) at a certain percolation threshold varying between 40 to 60% allows both the growth of thin and dispersed carbon nanotubes 24 that field emit electrons under the influence of the electric field generated by a biased anode, and plays the role of electron valve which control the transport and the injection of the electron current in each carbon nanotube 24 forming the electron sources (extractors) of the emitting structure. The "tunneling and/or hopping" of the electron from one catalytic particle 22 to another one is an activated mechanism. The conduction current flowing between the electrodes 14, 16 is conductivity-limited. The material 18 (catalytic nano-composite conduction layer) formed between the two electrodes is preferably made of catalytic metal nanoparticles such as Fe, Co, Ni or a mixture thereof embedded in an insulator matrix made of, for example, $Al_2O_3$, $SiO_2$, MgO, $Y_2O_3$, $ZrO_2$, and diamond like carbon. The material 18 exhibits a thickness varying from 10 to 150 nm with catalytic nanoparticles 22 having a dimension of around 5 nm. The electrical conductivity is in the order of $10^{-7}$ to $10^{-3}$ $Ohm^{-1}$ and is a function of the energy of activation and the percolation threshold. The percolation threshold is between 40-60% and depends on the metal-dielectric composition and the material thermal annealing temperature and time. The carbon nanotubes are grown on the material 18 and are anchored to the conductive small catalyst particles 22. The material 18 can withstand higher electrical field strength without risk of electrical breakdown.

Figure 2:
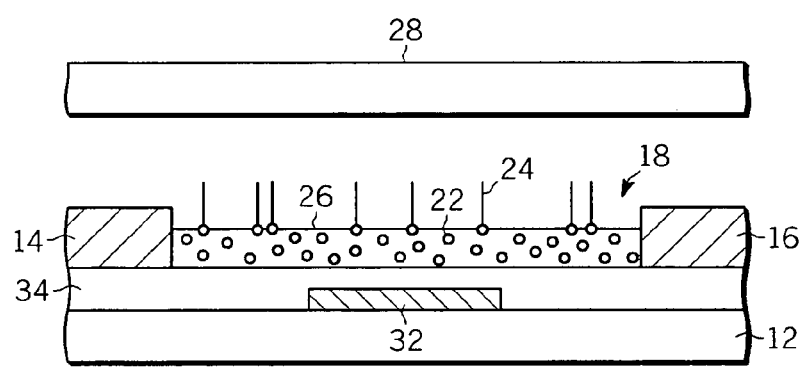
FIG. 2 is a cross section of a second embodiment of the present invention.

Referring to FIG. 2, another embodiment comprises a structure 30 including an electrode 32 formed on the substrate using standard lithographic techniques. The electrode 32 comprises a conductive material, for example, one of the metals molybdenum, Nobium, Hafnium, tungsten or iridium similar to that of the electrodes 14, 16. A dielectric layer 34 is formed over the substrate 12 and electrode 32. However, it should be understood that the electrode 32 may be formed directly between the substrate 12 and the material 18. A voltage of up to 5 volts is applied to the electrode 32, which is negative with respect to the anode 28, causing the electrons to further be encouraged to deflect towards the surface 26. By placing the electrode 32 in the middle between the electrodes 14 and 16, there is a tendency for the electrons to be emitted from the carbon nanotubes 24 also in the middle between the electrodes 14 and 16, and thus provide a more focused beam toward the anode 28.

Figure 3:
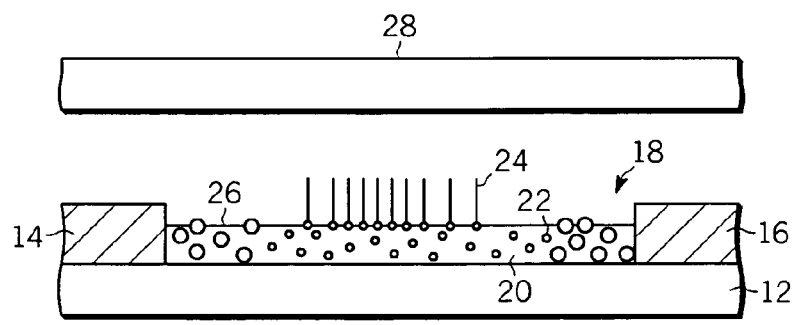
FIG. 3 is a cross section of a third embodiment of the present invention.

Referring to FIG. 3, yet another embodiment comprises a structure 40 similar to that of FIG. 1; however; the nanoparticles 22 in the material 18 are terminated by carbon nanostructures 24 (e.g., carbon nanotubes) formed on catalyst nanoparticles 22, serving as growth nuclei. In this embodiment the small catalytic nanoparticles 22 are preferably formed in the middle of the material 18 and larger catalytic nanoparticles 22 are formed on the sides of the material 18 near the electrodes 14 and 16. Since the carbon nanotube 24 dimension depends on the particle size of the catalyst nanoparticles 22, it is preferable that the catalyst nanoparticles 22 size and the density is 0.1-10 nm and $10^5$-$10^{11}$ nanoparticles/$cm^2$, respectively, and the distance between nanoparticles 22 is at least equal to the particle size. The size, density and material of the nanoparticles 22 are appropriately set for localized growth. Field emission from material 18 requires that the increase in energy of the emitted electrons during tunneling must be greater than the work function of the nanoparticles 22. To obtain a large gradient of the electric field directed into the vacuum space, the nanostructures 24 operate as electron emission extractors (antenna). Hence, the tunneling electrons between electrode 14 and 16 preferentially channel towards the nanoparticles 22 attached to the high field enhancement nanostructures 24 and are emitted into the vacuum space by the low electric field produced by electrode 28. This disposition of the small catalytic nanoparticles 22 is a desired area (centered between the larger nanoparticles in FIG. 3), results in a growth of the nanostructures 24 at that location and a focusing of the emission of the extracted electrons.

The present invention comprises a composite material 18 of metal-dielectric mixture including grains with nano-metric size which plays both the role of catalyst precursor for carbon nanotubes 24 synthesize and also as an electron regulation layer for electron injection into the carbon nanotubes 24. Furthermore, the use of this nano-composite catalytic material 18 with the carbon nanotubes 24 permits fabrication of unique multi-emitting electron sources, for applications such as Field Emission Displays.

Figure 4:
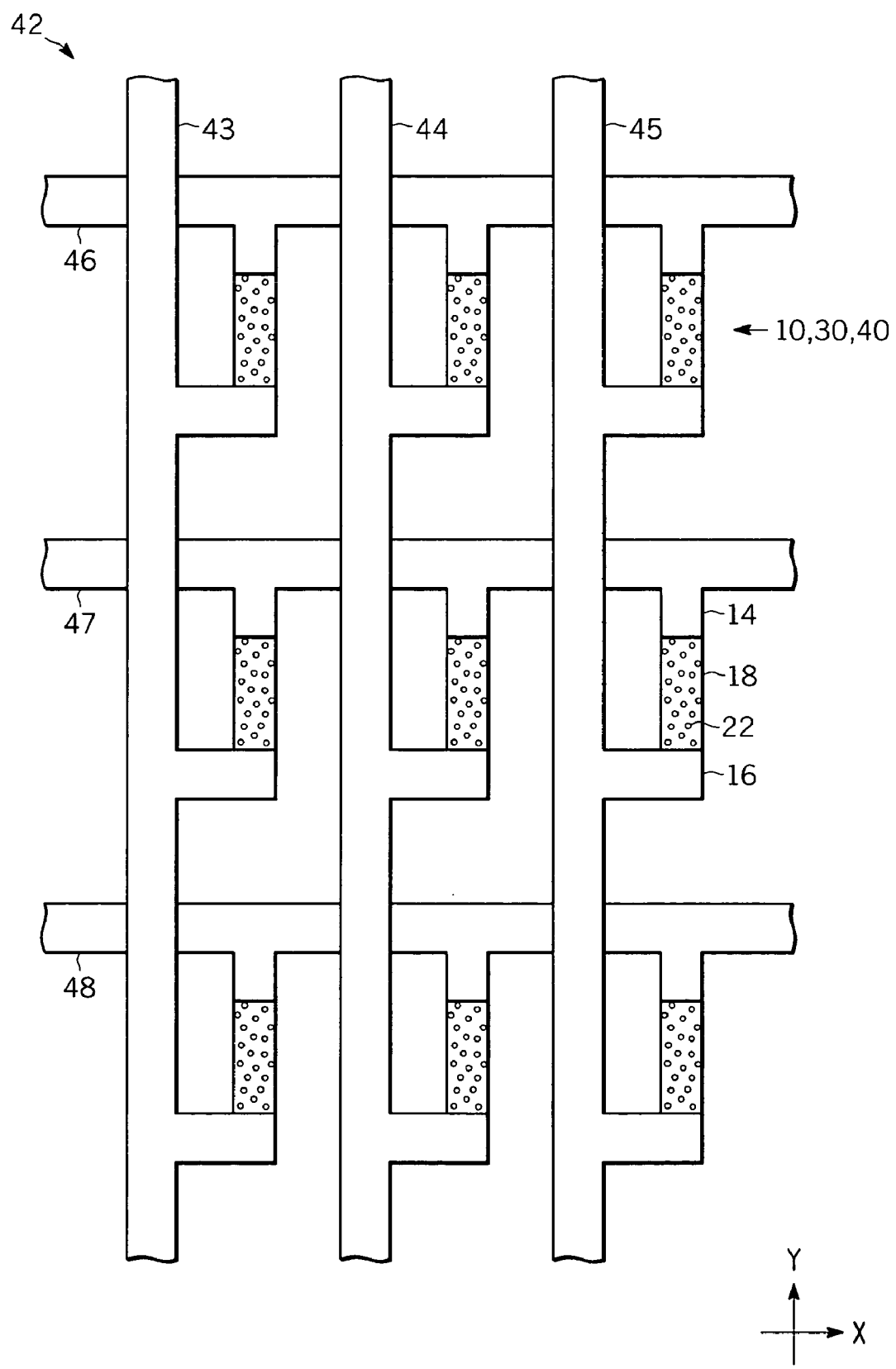
FIG. 4 is a schematic of an array of one of the embodiments of the present invention.

Referring to FIG. 4, the structures 10, 30, or 40 may easily be fabricated in an array 42, or matrix of structures 10, 30, 40, for use in an emissive display. The nanostructures 24 will emit electrons toward the anode 28 for illuminating RGB color phosphors (not shown) positioned on the anode 28 as is well known in the industry. Each sub-pixel of emitters 24 (not shown), included within each area of material 18, are uniquely coupled to one of the column conductors 43, 44, 45 and row conductors 46, 47, 48. For example, when a voltage is applied to column conductor 45 and row conductor 47, the voltage is applied to electrodes 14 and 16 and through material 18, as illustrated. While nine structures of sub-pixels of the display are shown, it should be understood that any number may be used with the present invention. For different size and different resolution displays, the sub-pixel length (in the Y direction) will be maintained, while the width (in the X direction) will vary.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. An emission device comprising:
 a conductivity limited material having first and second sides and a surface;
 a plurality of catalytic nanoparticles positioned within the conductivity limited material and at the surface;
 a plurality of nanostructures grown from the catalytic nanoparticles at the surface;
 a first electrode disposed contiguous to the first side;
 a second electrode disposed contiguous to the second side, the first and second electrodes configured to receive a voltage, wherein electrons flowing between the first and second electrodes tunnel between catalytic nanoparticles;
 an anode positioned so as to extract and receive a portion of the electrons from the catalytic nanoparticles through the nanostructures; and
 means for focusing the emission of the extracted electrons.

2. The emission device of claim 1 further comprising:
 a plurality of column conductors, one being coupled to the first electrode; and
 a plurality of row conductors, one being coupled to the second electrode, wherein the emission device is one of a plurality of emission devices, each uniquely coupled between one of the column conductors and one of the row conductors.

3. The emission device of claim 2 wherein the emission device is a display and the anode comprises phosphor thereon for receiving the electrons.

4. The emission device of claim 1 wherein the catalytic nanoparticles comprise one of nickel, iron, cobalt, or a combination thereof.

5. The emission device of claim 1 wherein the catalytic nanoparticles have a radius of 0.5 to 100 nanometers.

6. The emission device of claim 1 wherein the catalytic nanoparticles are spaced apart by between 1 and 100 nanometers.

7. The emission device of claim 1 wherein the means comprises a third electrode positioned contiguous to the conductivity limited material on a side opposed to the surface.

8. The emission device of claim 1 wherein the means comprises the catalytic nanoparticles comprising a first size disposed in a first area and a second size disposed in a second area, the second size being smaller than the first size, the second size enhancing carbon nanotube growth wherein electrons are predominantly emitted from the second area.

9. An emission device comprising:
 first and second electrodes;
 a conductivity limited material positioned between the first and second electrodes and having a surface;
 a plurality of metal nanoparticles distributed throughout the conductivity limited material, some of the metal nanoparticles being contiguous to the surface;
 a plurality of carbon nanotubes disposed from the metal nanoparticles contiguous to the surface; and
 an anode spaced apart from the carbon nanotubes for extracting and receiving electrons emitted from the carbon nanotubes in a first direction when a first potential is applied across the first and second electrodes to cause electrons to tunnel between the plurality of metal nanoparticles in a second direction substantially orthogonal to the first direction, and a second potential is applied to the anode; and
 a third electrode positioned contiguous to the conductivity limited material on a side opposed to the surface.

10. The emission device of claim 9 further comprising:
 a plurality of column conductors, one being coupled to the first electrode; and
 a plurality of row conductors, one being coupled to the second electrode, wherein the emission device is one of a plurality of emission devices, each uniquely coupled between one of the column conductors and one of the row conductors.

11. The emission device of claim 9 wherein the anode comprises phosphor thereon for receiving the electrons and the emission device is a display.

12. The emission device of claim 9 wherein the metal particles comprise one of nickel, iron, cobalt, or a combination thereof.

13. The emission device of claim 9 wherein the metal particles have a radius of 0.5 to 100 nanometers.

14. The emission device of claim 9 wherein the metal particles are spaced apart by between 1 and 100 nanometers.

15. The emission device of claim 9 wherein the metal particles comprise a first size disposed in a first area and a second size disposed in a second area, the second size being smaller than the first size, the second size enhancing carbon nanotube growth wherein electrons are predominantly emitted from the second area.

16. A method of emitting electrons for an emission device, comprising:
    applying a voltage across a conductivity limited material having a plurality of catalytic metal particles embedded therein, thereby causing the electrons to tunnel in a first direction between the metal particles; and
    emitting a focused flow of a portion of the electrons in a second direction substantially orthogonal to the first direction from carbon nanotubes grown from a portion of the catalytic metal particles.

17. The method of claim 16 wherein the emission device is one of a plurality of emission devices configured in an array, the array including:
    a plurality of column conductors, one being coupled to the first electrode; and
    a plurality of row conductors, one being coupled to the second electrode, wherein each of the plurality of emission devices are uniquely coupled between one of the column conductors and one of the row conductors,
    the method further comprising:
        selecting one of the plurality of emission devices by applying a voltage between one of the column conductors and one of the row conductors.

18. The method of claim 16 further comprising extracting and receiving the electrons by an anode.

19. The method of claim 16 wherein the focused flow includes deflecting the electrons towards the carbon nanotubes by a third electrode positioned contiguous to the conductivity limited material on a side opposed to the carbon nanotubes.

20. The method of claim 16 wherein the focused flow is enabled by the plurality of catalytic metal particles comprise a first size disposed in a first area and a second size disposed in a second area, the second size being smaller than the first size, the second size enhancing carbon nanotube growth wherein electrons are predominantly emitted from the second area.

* * * * *